[22.]
NATHANIEL MEAD.
Improvement in Wagon Axles.
No. 118,869.  Patented Sep. 12, 1871.
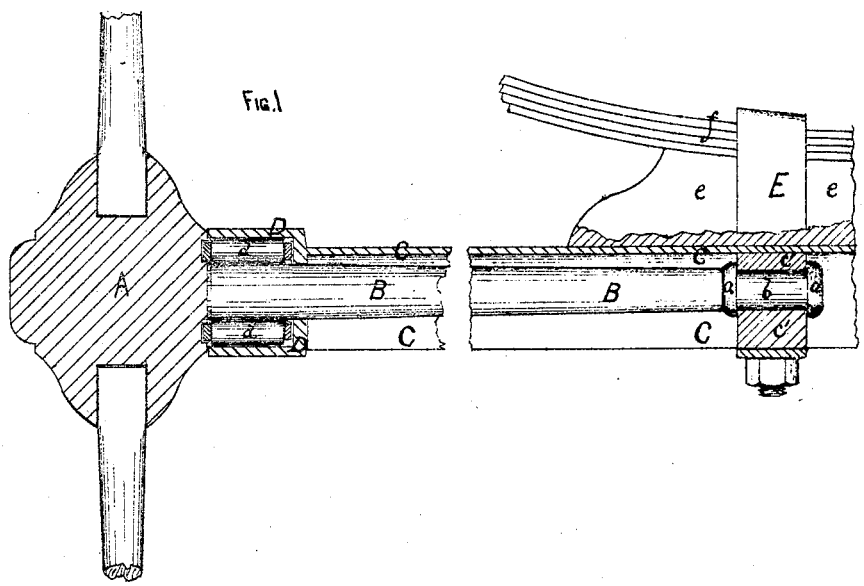
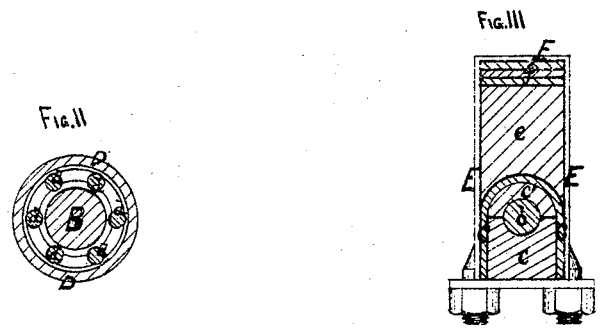
WITNESSES.

UNITED STATES PATENT OFFICE.

NATHANIEL MEAD, OF OIL CITY, PENNSYLVANIA.

IMPROVEMENT IN WAGON-AXLES.

Specification forming part of Letters Patent No. 118,869, dated September 12, 1871.

*To all whom it may concern:*

Be it known that I, NATHANIEL MEAD, of Oil City, in the county of Venango and State of Pennsylvania, have invented certain new and useful Improvements in Wagon-Axles, of which the following is a specification:

This invention relates to that class of vehicles in which the axle revolves with the wheel-hub; and it consists in an arm attached to each wheel-hub, which revolves in a hollow axle, and the application of friction-rollers to the outer ends and an oil-box or journal to the inner ends of the double axle, as hereinafter described.

In the drawing, Figure 1 is a sectional side elevation. Fig. 2 is a cross-section through the friction-rollers. Fig. 3 is a similar view through the journal-box, &c.

A is the hub, and B the arm attached rigidly thereto or forming a part thereof, and extending nearly to the center of the body of the vehicle. At this end it is formed into a journal, $b$, and is provided with flanges or collars $a\ a'$, which work or revolve in a divided journal-box, $c$, the object to be presently explained. C is a hollow axle, which extends entirely across from one wheel-hub to the other and partly or entirely encircles the arms B. On each end of the hollow axle, or forming a part of the same, is a metal box, D, which incloses a series of friction-rollers, $d\ d\ d$, which encircles the revolving-arm B of the hub A. These rollers are made and work in the usual manner.

The great advantage of the application of these friction-rollers is that they do away with a large amount of friction and carry the load easier, obviating the use of grease, &c., which is so objectionable in many ways. They also admit of the hub and axle or arm being made in one piece or firmly attached to each other, the advantages of which over the loose axle are well known. They also take off the strain borne by that part of the axle entering the hub, usually only five or six inches in length, and of very small circumference, and bring it onto the two arms, each of which will be of at least twenty inches in length. The other ends $b\ b'$, resting in the boxes $c\ c'$, take off the lateral strain from the hub end, thus relieving the friction-rollers from any end friction and consequent wear. Oil or grease is used here only in these boxes; but one of the great objections to oil, by soiling clothes, is done away with, as it is in a part of the vehicle out of the way of persons getting in or out. They also insure the journals or arms always being in a line with each other, thus preventing increased friction in drawing over rough roads or around corners. For heavy-draft wagons and rough roads my devices will be found invaluable, and for such I more particularly intend them. The box $c$ is held in place by a clip, E, which encompasses the hollow axle C, the wooden spring-rest $e$, and spring $f$, the two latter resting on the hollow axle, permitting a free movement to the arm or inclosed axle B.

The main advantages of my arrangement are that the center boxes $c\ c'$ and friction-rollers $d\ d'$ on the end of the hollow axle reduce the area of friction to a very small compass and overcome the leverage and friction of a narrow or hollow wheel-hub.

I do not claim, broadly, a wheel-hub and axle formed together; but

What I claim is—

1. The arm B made in two pieces, or disconnected in the center, and rigidly attached to or forming part of the wheel-hub A, and revolving in boxes $c\ c'$ arranged in the hollow axle C, substantially as hereinbefore set forth.

2. The friction-rollers $d\ d'$ arranged within the hollow boxes D of the hollow axle C, in combination with the revolving axles B and wheel-hub A, substantially as and for the purpose set forth.

3. The collars or flanges $a\ a'$ formed on the inner end of the revolving axle B, as and for the purpose set forth, in combination with the boxes $c\ c'$, clip E, and hollow axle C, substantially as set forth.

4. The series of friction-rollers arranged within the hollow boxes D and encircling the periphery of the revolving axle B, as and for the purpose set forth.

In witness whereof I have hereunto signed my name in the presence of two subscribing witnesses.

NATHANIEL MEAD.

Witnesses:
 J. R. DRAKE,
 JAMES L. NORRIS.